July 1, 1941.    R. MEYERS    2,247,763

EXPOSURE METER

Filed April 29, 1939    2 Sheets-Sheet 1

INVENTOR.
RICHARD MEYERS
BY
ATTORNEYS

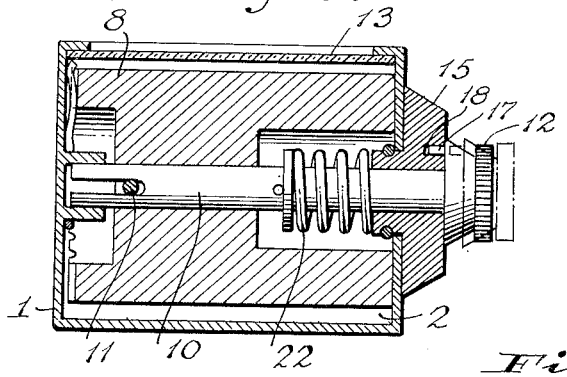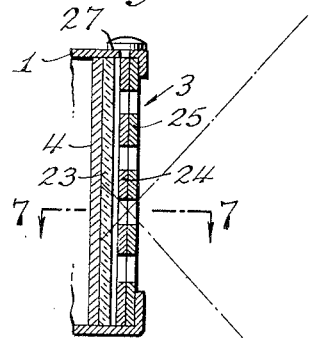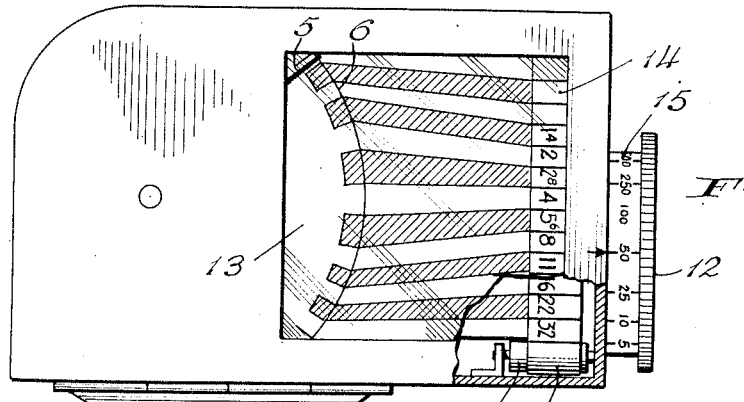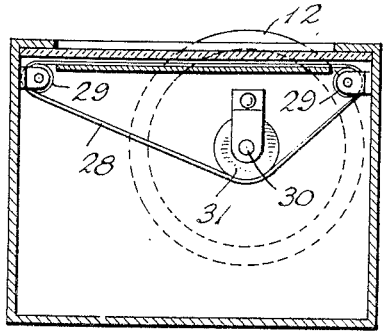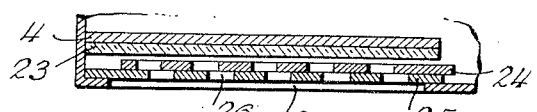

Patented July 1, 1941

2,247,763

UNITED STATES PATENT OFFICE 2,247,763

EXPOSURE METER

Richard Meyers, New York, N. Y.

Application April 29, 1939, Serial No. 270,714

2 Claims. (Cl. 88—23)

This invention relates to an exposure meter used in photography whereby the light intensity may be measured and the lens setting is automatically indicated.

In exposure meters now in use in the art of photography, it is necessary, after the light intensity has been ascertained, to set up the light intensity reading thus obtained on a supplementary dial bearing computations which transpose such light intensity readings into the required corresponding lens setting (the lens setting being the correlation of the size of the shutter aperture to the shutter speed).

The device of this invention eliminates the supplementary dial and the light value indicated by a meter is directly transposed and indicated into the required lens setting.

Another characteristic of this invention involves the provision of a mechanism whereby the exposure meter may be adjusted to indicate the proper lens setting depending upon the Scheiner rating of the particular film being used by the photographer.

Figure 1:
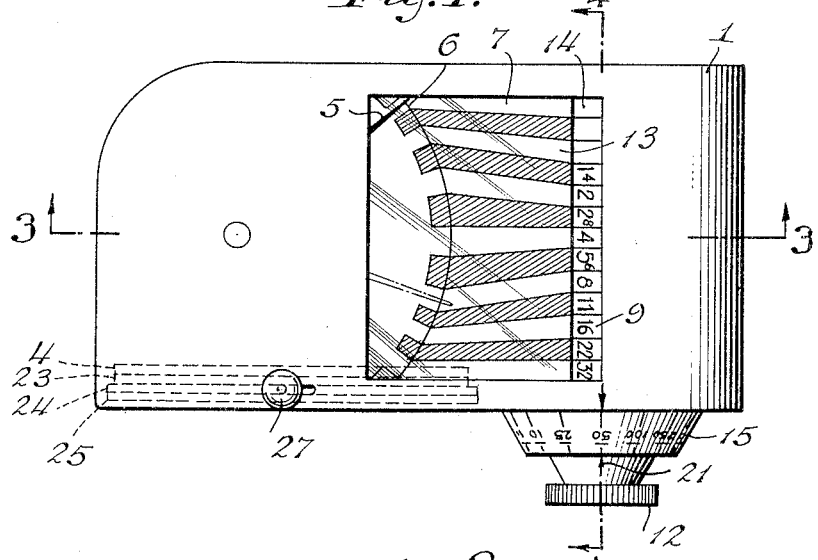
Figure 2:
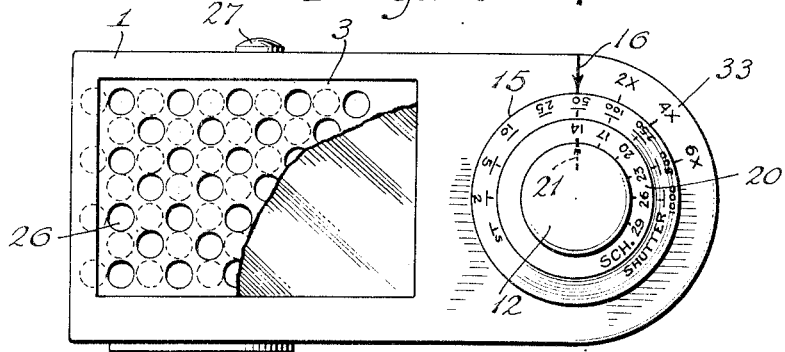
Figure 3:
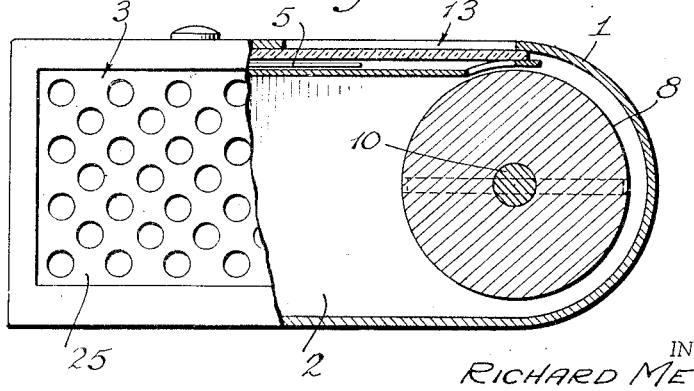

In the drawings, Fig. 1 is a plan view of the meter; Fig. 2 is a side elevation; Fig. 3 is a longitudinal section on the line 3—3 of Fig. 1; Fig. 4 is a cross section on the line 4—4 of Fig. 1; Fig. 5 is a detail of the drum carrying the lens setting characters; Fig. 6 is a cross section of an adjustable arrangement for excluding light from the field beyond the object being photographed; Fig. 7 is a section on the line 7—7 of Fig. 6; Fig. 8 is a plan view showing a modified form of chart carrying the lens setting characters; Fig. 9 is a cross section showing the arrangement for supporting the endless chart of Fig. 8.

The casing 1 provides a hollow body 2, which hollow body is provided, in the side wall thereof, with light apertures 3, which constitute an opening for the entry of light. A photovoltaic cell 4 is positioned directly inside of the light opening and is consequently exposed directly to the action of light entering the light opening. The cell 4 may be of any approved type, for instance, a metal plate, as steel, having deposited thereon a thin coating of a suitable light sensitive material such as selenium, being arranged to actuate through a suitable magnet (not shown) a pointer 5, which pointer 5 moves, under the impulse of the cell-actuated magnet, in the arc 6, moving over a scale 7 provided with thirteen divisions alternately shown in contrasting arrangement such, for instance, as alternate white and crosshatch sections. The pointer 5 consequently will move by reason of its predetermined coordination to the activity of the cell 4, the activity of which is dependent upon the light intensity admitted through the light opening. A drum 8 is arranged in one end of the hollow body (as shown in Fig. 3) and carries upon the surface thereof a chart 9, which carries upon its face a series of calculations coordinated on the basis of the relationship between lens openings and shutter speeds, the sensitiveness of the cell and the microammeter movement being adjusted on the basis of these calculations. The drum 8 is arranged upon a shaft 10, slotted at one end, into which slot the pin 11 fits for the purpose of connecting the drum with the shaft. The shaft, and consequently the drum, may be turned by the knurled button 12. The drum rotates beneath the glass window 13 in the top wall of the casing in order to expose the scale 7 and a single row 14 of values on the chart 9, which is brought to exposure by rotation of the drum. The shaft 10 also carries a dial 15, which dial is arranged next to the casing 1, immediately beneath the button 12. The dial 15 is calibrated to indicate shutter speeds, the indications as shown varying from a shutter speed of two seconds to 1/1000 of a second (see Fig. 2), the relation of the $f$ value of each row to the shutter speeds (shown in Fig. 5) varying from one second for the lowermost row, to 1/100 of a second for the uppermost row.

The proper alignment of the indications on the dial 15 and the exposure of the corresponding values beneath the window 13 is insured by aligning the selected indication on the dial 15 with the arrow 16.

It will be noted from the foregoing description that the cell 4, the scale 7, and the indications on the chart 9, are coordinated (with respect to a given Scheiner value), whereby the light value or intensity is indicated in the appropriate division of the scale, each particular division of the scale 7 being adapted to coincide with the related values indicated on the chart 9 and with each row of indications on the chart 9 (calculated on the basis of a particular shutter speed) indicated on the dial 15.

The operation of the device is as follows: Assuming that the photographer (knowing the Scheiner value of the particular film being used by him) determines that he desires to photograph an object at a speed of 1/50 of a second, he would turn the button 12 until the indication 1/50 (representing 1/50 of a second) is aligned with the arrow 16, whereby the corresponding row of values pertinent to a shutter speed of 1/50 of a second would be exposed through the window 13 in alignment with the pertinent divisions of the scale 7. The light opening is then exposed, directed toward the object to be photographed, and the pointer 5 moves, under influence of the light reaction on the cell 4, to the particular division of the scale 7 corresponding to the light value impressed upon the cell. Assuming that the pointer came to rest in the division of the scale 7 which is aligned with the f value 8a on the chart 9, the photographer is informed that, for the light value thus determined, he would require a lens setting corresponding to this f value and would accordingly make such adjustment upon the camera. It is evident, therefore, that, within the capacity of the particular device illustrated in the drawings, a shutter speed range is provided from a maximum of two seconds to a minimum of 1/1000 of a second, and the operator having determined the shutter speed at which he desires to operate, based upon his experience, turns the button 12 to align such shutter speed with the arrow on the dial 15, thereby automatically aligning and registering the f values pertinent to the selected shutter speed (for the particular Scheiner sensitiveness of the film being used), whereupon the pointer, when the cell is exposed, comes to rest in alignment with the pertinent division of the scale 7 and the pertinent f value, whereby the photographer is advised as to the proper lens setting at which the particular subject can be photographed to the best advantage.

The description of the foregoing meter may be assumed to have been made on the basis of the correlation of the operative parts to function with a film having a Scheiner rating of 14. It is a practice, however, of photographers to use films of different speeds or "Scheiner ratings" and for the purpose of permitting the use of the meter of this invention with different films, a device is embodied in the meter which permits adjustment of the meter to accommodate and function with films of various speeds.

The photographer ascertains the Scheiner rating of the particular film which he is using by a schedule supplied to him, and, on the basis of this information, he proceeds to adjust the meter for the particular film being used by him by changing the relation of the dial 15, provided with a scale 20 of degrees Scheiner, to the chart 9. This change of relation is accomplished by pulling outwardly on the button 12, which releases a pin 17 normally seated in a recess 18 in the dial 15, bringing the parts to the position shown in broken lines in Fig. 4. The pin is held out of the recess 18 and the button 12 turned (leaving the dial 15 stationary) until the arrow 21 points to the degrees Scheiner corresponding to the rating of the film being used. The button 12 is then released and under the pull of the spring 22, the locking pin 17 enters the recess and reengages with the dial 15.

The specific illustration as shown in the drawings may be assumed to be set to operate with a film having a Scheiner rating of 14, but should the photographer determine to use a film having another Scheiner rating, he must manipulate the disc and its scale to coordinate the drum 8 and chart 9 to adjust the same in order to obtain the best results with the particular film with which the camera is charged. Assuming that the photographer wishes to discontinue operating with a film having a Scheiner rating of 14 and to use a film having a Scheiner rating of 20, he would, after pulling out the button 12, turn the button until the arrow 21 is aligned with the Scheiner rating indication 20 (keeping the dial 15 stationary) and, having completed the adjustment, the button 12 is released, the pin 17, under the influence of the spring 22 reengaging with its recess, completing the adjustment for operating with a film having a Scheiner rating of 20. By the same manipulations the meter, within the capacity shown in the drawings, may be adjusted to function with all of the Scheiner ratings indicated on the scale 20 in Fig. 2 and, by reason of the coordination of the characters on the chart 9, to the Scheiner ratings as indicated on the scale 20, the device will function to give an indication of the most advantageous lens setting at which the photographer may operate.

The cell 4 is protected from dust by the section of glass 23 which lies immediately in front of it. The aperture for admitting light to the cell is preferably in the form of two plates 24, 25, provided with a multiplicity of openings 26, the outer plate 25 being stationary and the inner plate being adjustable by movement of the button 27, causing the apertures in one position to align as shown in Fig. 6 and to be completely out of alignment for the purpose of cutting out entry of light entirely to the cell 4. The total area of the plates 24 and 25 have a definite relation to the field being photographed and by such means light outside of the field may be excluded, such adjustment for the partial exclusion of light being shown in Fig. 7.

A modification of the drum and chart arrangement is shown in Figs. 8 and 9, in which the chart 9 is carried by an endless belt 28 supported by the rollers 29, suitably mounted in the walls of the casing 1. The shaft 30 attached to the button 12 is provided with a friction roller 31 engaging the endless belt 28 and adjusting it in coordination with the movement of the button 12 and its accompanying dial 15. The only advantage which the endless type of belt provides is that a larger number of speeds, apertures, and especially Scheiner ratings, can be employed with the same type of dial mechanism.

In some instances, photographers desire to use a color filter, in connecion with the taking of photographs, in which a light meter is also employed. The light meter necessarily requires a change in the lens setting and provision is made in connection with this invention for making a compensating adjustment when a light filter is used. On the basis of the calculations shown on the chart, it would be necessary to shift the chart from the exposure position to lengthen the time of exposure to compensate for the density of the filter. These calculations can readily be made and the degree of adjustments is indicated by the scale 33, showing the adjustment for filter factors known as 2X, 4X, and 6X. To illustrate: assuming that without a filter the photographer determined to use a shutter speed of 1/50, if the filter rated 2X, the dial would be adjusted so as to bring the 1/50 indication under 2X, which would means that the 1/25 shutter speed would be in alignment with the arrow. Other adjustments for other color filters are made accordingly.

The underside of the casing 1 is provided with a spool-like device 32 whereby the meter may be attached to a coacting member on the camera.

For convenience in recognizing each unit f value on the chart 9, the backgrounds of the units in each series may be given a distinctive color, in order that the same numerals in each series would have the same color background.

I claim:

1. A light meter comprising a small compact casing, a light-sensitive member carried by the casing, a pointer adapted to be actuated by the reaction of light upon said light-sensitive member and to move to various positions under different conditions of light intensity, a scale arranged with respect to the path of movement of said pointer, a shaft arranged transversely of said casing, a chart connected with said shaft, said chart having a series of indications thereon representing lens opening values, said shaft extending through a wall of said casing, a dial carried by and rotatable on said shaft, said dial lying against a wall of said casing, shutter speed and Scheiner indications on said dial, an adjusting member on said shaft, said adjusting member being adapted to be moved and simultaneously adjust said chart, said dial and the shutter and Scheiner indications carried by said dial, a spring connected with said shaft and normally adapted to force said adjusting member toward said dial, said dial being movable to expose at will any series of values on said chart in alignment with said scale and means adjustably coupling said dial and said shaft.

2. In a light meter of the character set forth in claim 1, in which the shaft is transversely movable by pull on said adjusting member and the chart is carried by a member having sliding relation to said shaft, said adjusting member being provided with means for selectively coupling said chart and said dial, said spring normally urging said pin into said slot.

RICHARD MEYERS.

CERTIFICATE OF CORRECTION.

Patent No. 2,247,763. July 1, 1941.

RICHARD MEYERS

It is hereby certified that error appears in the printed specification of the above numbered patent requiring correction as follows: Page 3, second column, lines 17 and 18, claim 2, strike out the comma and words ", said spring normally urging said pin into said slot"; and that the said Letters Patent should be read with this correction therein that the same may conform to the record of the case in the Patent Office.

Signed and sealed this 5th day of August, A. D. 1941.

(Seal)

Henry Van Arsdale,
Acting Commissioner of Patents.